Figure 1:
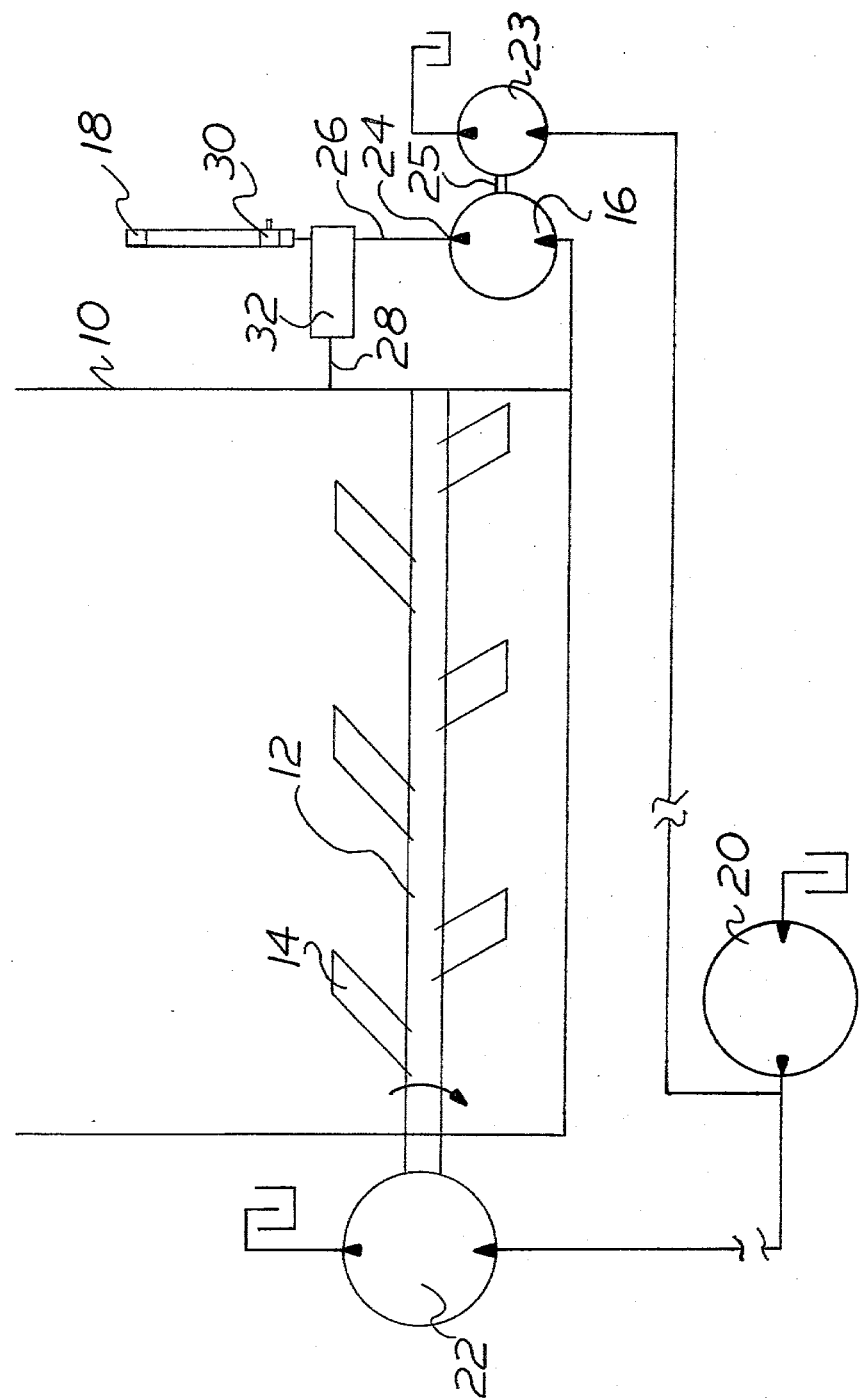

United States Patent [19]

Licursi

[11] 4,238,072
[45] Dec. 9, 1980

[54] METHOD OF DISPENSING A GRANULAR FERTILIZER

[76] Inventor: Nicola Licursi, 7588 White Pine Dr., Chesterland, Ohio 44026

[21] Appl. No.: 98,621

[22] Filed: Nov. 29, 1979

Related U.S. Application Data

[63] Continuation of Ser. No. 888,739, Mar. 21, 1978, abandoned.

[51] Int. Cl.³ .............................................. A01C 21/00
[52] U.S. Cl. .................................. 239/1; 47/DIG. 4; 71/64 C; 239/142
[58] Field of Search .................... 239/1, 127, 142–144, 239/172; 47/DIG. 4, 58; 71/64 R, 64 A, 64 B, 64 C, 64 D, 64 DB, 64 F, 64 G

[56] References Cited

U.S. PATENT DOCUMENTS

| | | | |
|---|---|---|---|
| 2,878,617 | 3/1959 | Finn | 239/127 X |
| 2,988,286 | 6/1961 | Snyder et al. | 239/127 X |
| 3,310,237 | 3/1967 | Welch | 239/142 X |
| 4,036,627 | 7/1977 | Funk | 71/64 C X |

OTHER PUBLICATIONS

"Nitrogen Fertilization of Turfgrass", Agricultural Chemicals Technical Information #AI-105, Pub. by Hercules Inc.
"Slow Release Fertilizers with IBDU®", Pamphlet Pub. by Par Ex ® Professional Products.
"Facts About Professional Fertilizer for Turf and Their Characteristics", Pamphlet by E. E. Joe Bredeson, Par Ex ® Territorial Manager.
"IBDU ® Course", Technical Bulletin #2, Pub. by Par Ex ® Professional Products.
"Application Information", Technical Bulletin #3, Published by Par Ex ® Professional Products.
"Look for the Blue Chip Label", Pamphlet Pub. by Hercules Inc., 1970.
"Annual Steps to Good Lawn Care", Pamphlet Pub. by Hercules Inc., 1972.
"Lawns Stay Greener Longer with Nitroform®", Pamphlet Pub. by Hercules Inc., 1978.
"Turfgrass Performance Guide", Booklet Pub. by Par Ex ® Professional Products, 1978.
"Nitroform ®", Product Data #292-6, Pub. by Hercules, Inc.
"Nitroform ®", Turf Notes #101-2, Pub. by Hercules Inc.
"Nitrogen ®, Organic Nitrogen", Turf Notes #105-2, Pub. by Hercules Inc.
"Fertilizers for Controlled Release of Nitrogen", Agricultural Chemicals, Technical Information #AI-101 A, Pub. by Hercules Inc.

Primary Examiner—Andres Kashnikow

[57] ABSTRACT

A method for applying a normally dry granular fertilizer having granular particles with slow release lawn nutrients and a particle size in the range of from 8 to 50 mesh and carrying slow released lawn nutrients and some water soluble nutrients to a lawn. The method includes the steps of dispersing in an aqueous medium from about 5 to 15% by weight of the normally dry granular fertilizer to create a suspension of granular particles with slow released lawn nutrients, agitating the granular particles to maintain them in suspension, and spraying the suspension on the lawn.

6 Claims, 1 Drawing Figure

METHOD OF DISPENSING A GRANULAR FERTILIZER

This is a continuation, of application Ser. No. 888,739 filed Mar. 21, 1978 now abandoned.

BACKGROUND OF THE INVENTION

This invention relates to a method for applying normally dry relatively large particle size (granular) fertilizers to crops, such as lawns. Lawn fertilizers are available in various forms including solutions of nutrients in water, dispersions (suspensions) of fine powders (70-80 mesh and smaller) in an aqueous medium, dry powders and dry granules. In some cases, the nutrient materials are supported on an inert carrier, e.g. sand or clay.

Both liquid fertilizers and dispersions of fine powders in aqueous mediums are usually spray applied using conventional types of liquid solution fertilizer spraying equipment. A typical example of a spray applied dispersion of a powdered fertilizer material is illustrated by the U.S. Pat. No. to Funk 4,036,627. This patent discloses a high analysis fertilizer formulaton of low bulk density powdered ureaformaldehyde having soluble and insoluble portions combined with soluble monopotassium phosphate in which the resultant mixture is a dry homogeneous blend, free of fillers and binding agents, and which may be carried in a liquid medium for application to surface or subsurface areas by conventional liquid solution fertilizer applying equipment. The suspension generally has a fairly high concentration of the fine powder particles in the liquid medium.

Dry fertilizers in the powder form or the granular form are conventionally applied by dry spreaders. Numerous examples of dry powdered and granular fertilizer compositions are well known to those skilled in the art. Recently, these have begun to be formulated with provisions for timed (slow) release of the nutrients to avoid "burning" the crop and to reduce the number of applications in a growing season.

Each of the various physical forms of fertilizer compositions has its advantages and disadvantages. Spray applied liquid fertilizer solutions and dispersions of powdered nutrient materials are characterized by the ability to be applied evenly and from a tank truck, for example. These fertilizer forms usually provide nutrients which are immediately available to the lawn, and therefore enable quick response of the lawn to the application, i.e. quick "greening" of the lawn. However, such liquid solutions are often too rich in immediately available nutrients, particularly nitrogen. A solution which is too rich in nutrients can cause "burning" of the lawn. Additionally, insect and fungus growth may be accelerated. Still further, liquid solution type fertilizers do not often possess long life on or in the ground and their effect is quickly lost. Frequent application is required to maintain a desired nutrient level in the soil during a growing season.

With the finely divided powder or dispersion, a principal problem is retention on the leaves or blades of grass. This can also cause burning. Additionally, ambient conditions and normal lawn care procedures may result in loss of a significant value of the fertilizer. For example, application of dry powder is usually accompanied by considerable dusting and wind loss. Moreover, when the lawn is cut, and the clippings collected, a substantial portion of a powdered fertilizer, whether dry or dispersion applied, is carried away and lost. With a rotary lawn mower, dusting of a powdered fertilizer can also be a problem.

Granular fertilizers which are spread on the lawn in a dry condition, do not generally have the foregoing types of application problems encountered with powdered fertilizers. Because of the larger particle size, dusting is not a problem. Further, retention on the blades of grass or on leaves is not generally a problem with granular fertilizers. Thus, loss on removal of grass clippings is negligible. However, like any spreader applied fertilizer, application is usually uneven because of turns at the end of a row, skips, overlaps, etc. Without care, overfertilizing can occur in certain areas and under fertilizing in others. A blotchy appearance results. Furthermore, the immediate nutrient availability of granular fertilizers may be lost due to leaching. Thus, with granular fertilizers obtaining quick "greening" can be a problem. Thus, as can be seen from the foregoing discussion the problems which are often encountered in the application of liquid, liquid dispersion or dry spread granular fertilizers are also manifested in the quality of performance of the fertilizer.

SUMMARY OF THE INVENTION

Briefly stated, the present invention resides in a method for applying normally dry granular fertilizers having slow release nutrients and having a particle size such that at least about 80% of the dry fertilizer will pass through a 8 mesh screen and be retained on a 50 mesh screen. The method comprises suspending the granular fertilizer in an aqueous medium to form a suspension of granular particles having slow released lawn nutrients and comprising from about 5% to about 15% granular particles by weight, agitating the suspension to prevent settling of the granular fertilizer and spraying the suspension onto a crop, such as a lawn. Further, the preferred embodiment of the invention contemplates a suspension in which up to about 8% by weight of the normally dry granular fertilizer dissolves in the aqueous medium thereby making some nutrients immediately available to the lawn upon spraying for an instant "greening" effect.

The provision of a suspension of a normally dry spread granular fertilizer in an aqueous medium enables a much more even application of the fertilizer while preserving the time (slow) released advantages of dry granular fertilizers. Further, the method of the present invention contemplates a particularly advantageous granular suspension which has been found to provide an unusually high quality fertilizer which results in not only instant "greening" of a lawn (i.e. within 1-4 days of application), but also long life for extended periods between applications.

The term "granular" as used herein will be understood as directed to particles which will pass through an 8 mesh U.S. Standard Screen and be retained on a 50 mesh screen, i.e. 8-50 mesh size. Of course, some small percentage of particles will be smaller than 50 mesh and will pass through such a screen. However at least 80% and preferably 90% will pass an 8 mesh screen and be retained on a 50 mesh screen.

Further features of the invention will become further apparent from the following detailed description taken with reference to the accompanying drawing which is a schematic illustration of the principle features of the system for applying fertilizer to a lawn according to the invention.

DETAILED DESCRIPTON AND SPECIFIC EXAMPLES

As noted above the method of the invention contemplates spraying a normally dry spread granular suspension to a crop such as a lawn. The granular suspension is formed in a supply tank 10 which is supported on a truck or other suitable vehicle. A motor driven shaft 12 disposed in the tank 10 carries a series of large paddles 14 which are rotated to prevent settling of the granular particles to maintain the suspension. A centrifugal pump 16 pumps the suspension from the tank and out a dispensing nozzle 18, e.g. a spray head.

EXAMPLE

A suspension according to the invention was formed with a normally dry spreadable granular fertilizer having a nutrient ratio of "30-4-4" and containing 30% nitrogen of which 7½% is water insoluble nitrogen, 4% $P_2O_5$ and 4% soluble potash ($K_2O$). The normally dry granular fertilizer mix material includes as nitrogen sources, 1.25% by weight of the entire fertilizer composition ammonium phosphate, 10.7% urea-formaldehyde, and 18.05% urea and other soluble organic materials. It has a potential acidity equivalent to 1100 lbs. of $CaCO_3$ per ton of fertilizer. A dry granular fertilizer having the foregoing form is commercially available from Lebanon Chemical Corp., Lebanon, Pa..

The foregoing granular fertilizer is suspended in water to the extent of 8.76% by weight in 100 parts of water. For convenience, this amounts to 40 fifteen pound bags of the normally dry spread granular fertilizer suspended in 750 gallons of water in tank 10. The composition will dissolve partially in water to the extent of about 7% by weight to provide immediate acting nutrients for instant greening, (within 1-4 days after application). About 93% by weight of the fertilizer remains in suspension in granular form. This quantity of suspension is sufficient to fertilizer 200,000 sq. ft. of lawn. Four quarterly applications are recommended for a given lawn.

The truck mounted tank 10 has a capacity of 800 gallons to accommodate the suspension. The shaft 12 is hydraulically driven to rotate agitation paddles 14 during application. A suitable power-take-off connection to the truck engine drives a main pump 20. Pump 20 directs fluid for powering a rotary hydraulic motor 22 to rotate the shaft 12. Pump 20 also directs fluid to power a hydraulic motor 23 having an output shaft 25 for driving pump 16. Flow through nozzle 18 is manually controlled by an on-off "gate" valve 30 in the hose. Valve means associated with the pump (and schematically shown at 32) assures pumped recirculaton of the suspension when the valve 30 is closed. The tank is provided with an outlet connected to the suction side of the centrifugal pump 16. The pump 16 is capable of delivering 3.5 gallons/minute, which is a convenient delivery rate. The delivery side of the pump includes an outlet 24 attached to a flexible hose (conduit) 26 connected with the nozzle 18. A branch conduit 28 directs excess flow back the the bank, under the control of valve means 32.

The exit end of the hose is provided with the nozzle 18. The nozzle is preferably an inverted V-cut nozzle having an outlet opening formed in a pair of covering surfaces, as is known in the spraying art. The V-cut nozzle enables a flat fan-like spray of the suspension to be obtained.

Suitable hydraulic equipment as described above for spraying a suspension according to the invention is manufactured by Finn Equipment Company, Cincinnati, Ohio.

In use, the suspension is agitated within the tank and quickly attains a quite uniform distribution of the insoluble granular particles. The granular suspension is then sprayed on a lawn. When the water solution soaks into the ground, it carries with it the soluble nutrients for quick availability to the grass. This effects instant "greening". The insoluble granules carrying time (slow) release nutrients penetrate into the root system of the law. The granules because of their larger size resist sticking to the blades of grass, or plant leaves, and tend to fall to the ground or to the lower portions of the grass aided by the washing effect of the aqueous medium. Many of the granules penetrate to the grass root system. Thus, the granular fertilizer provides a "instant greening" effect and at the same time possesses all the advantages of macro size granular particles, such as greatly reduced dusting, loss due to wind, loss on collected clippings, better control of burning, etc. Acceleration of insect and fungus growth is due to too much nitrogen. This is controlled in the present method.

In another example, 15% by weight of the same granular fertilizer was suspended in 100 parts of total suspension and applied in the same manner. For convenience about 62 fifteen pound bags in 750 gallons of water will yield this concentration. This material may be applied as in the preceding example with similar results.

The formulation of high analysis fertilizers is well known and a variety of proportions of nitrogen, potassium and phosphate are commercially available. In fact by the process contemplated by the present invention it is believed that various N, N-$P_2O_5$, N-$P_2O_5$-$K_2O$ or N-$K_2O$ fertilizers may be suspended as relatively large particles in an aqueous medium with some dissolution, to provide an improved means for distrubiting a time release fertilizer with immediate availability of plant nutrients for rapid response.

Although the preferred compositions herein consist essentially of water (e.g. tap water, lake water, rain water or distilled water) and the granular fertilizer, it will be understood that other ingredients either water soluble or water insoluble including inerts, insecticides, fungicides, colorants, dispersing agents, wetting agents, etc. may be included for in their ususal amounts, e.g. 0.5% to 10% by weight for their intended purposes without in any way affecting the compositions hereof.

What is claimed is:

1. A method for dispensing a granular normally dry fertilizer onto a lawn, said granular normally dry fertilizer in a dry state having a particle size such that at least about 80% of the granular fertilizer composition will pass through an 8 mesh screen and will be retained on a 50 mesh screen and having water soluble readily available lawn nutrients and slow released water insoluble lawn nutrients which remain in granular particles when said fertilizer is mixed with water, which comprises the steps of suspending from about 5% to about 15% by weight of the total suspension of said granular fertilizer in water to form a suspension of granular particles having slow released lawn nutrients in a solution of readily available lawn nutrients, agitating said suspension to prevent settling of the granules thereof, and spraying said granular suspension on the lawn.

2. A method in accordance with claim 1 additionally including the step of dissolving up to about 8% by weight of said granular normally dry fertilizer in the water to provide the solution of readily available lawn nutrients prior to spraying on the lawn.

3. A method in accordance with claim 1 in which the fertilizer has a nutrient ratio of 30-4-4.

4. A method for dispensing a granular normally dry fertilizer onto a lawn, said granular normally dry fertilizer in a dry state having a particle size such that at least about 80% of the granular fertilizer composition will pass through an 8 mesh screen and will be retained on a 50 mesh screen, said normally dry fertilizer having a nutrient ratio of 30-4-4 and includes 30% nitrogen of which 7½% is water insoluble nitrogen which remains in granular particles when said fertilizer is mixed with water, 4% soluble $P_2O_5$ and 4% $K_2O$, said normally dry fertilizer including as nitrogen sources 1.25% by weight ammonium phosphate, 10.7% urea-formaldehyde and 18.05% urea and other soluble organic materials, which comprises the steps of dispersing said granular normally dry fertilizer in water in an amount of about 8.7 parts by weight fertilizer to 100 parts water to form a suspension of granular particles having slow release lawn nutrients in a solution of readily available lawn nutrients, agitating said suspension to prevent settling, and spraying said granular suspension on the lawn.

5. A method for dispensing a granular normally dry fertilizer onto a lawn, said normally dry fertilizer in a dry state having a particle size such that at least about 80% of the granular fertilizer composition will pass through an 8 mesh screen and will be retained on a 50 mesh screen, said normally dry fertilizer further including granular particles having some soluble lawn nutrients and slow released lawn nutrients which remain in granular particles when said fertilizer is mixed with water, which comprises the steps of suspending said granular normally dry fertilizer in an aqueous medium to form a solution of readily available lawn nutrients and a suspension of granular particles having slow released lawn nutrients, agitating said suspension to prevent settling of the granules thereof, and spraying said granular suspension on the lawn.

6. A method in accordance with claim 5 additionally including the step of dissolving up to about 8% by weight of said fertilizer in the water to form the readily available lawn nutrients.

* * * * *